March 31, 1953   B. D. LOUGHLIN   2,633,527
ANGULAR VELOCITY MODULATED WAVE-SIGNAL RECEIVER
Filed Nov. 28, 1947   2 SHEETS—SHEET 1

*INVENTOR.*
BERNARD D. LOUGHLIN
BY John P. Harvey
ATTORNEY

March 31, 1953     B. D. LOUGHLIN     2,633,527
ANGULAR VELOCITY MODULATED WAVE-SIGNAL RECEIVER
Filed Nov. 28, 1947     2 SHEETS—SHEET 2

*INVENTOR.*
BERNARD D. LOUGHLIN
BY John A. Harvey
ATTORNEY

Patented Mar. 31, 1953

2,633,527

UNITED STATES PATENT OFFICE 2,633,527

ANGULAR VELOCITY MODULATED WAVE-SIGNAL RECEIVER

Bernard D. Loughlin, Lynbrook, N. Y., assignor to Hazeltine Research, Inc., Chicago, Ill., a corporation of Illinois Application November 28, 1947, Serial No. 788,569

14 Claims. (Cl. 250—20)

The present invention relates, in general, to angular-velocity-modulated wave-signal receivers and is particularly directed to such receivers which translate the received signal by way of a sampling or pulse-modulation process. Receivers of the type under consideration are useful for the reception of either frequency-modulated or phase-modulated carrier-wave signals which may be generically defined as signals exhibiting an angular-velocity modulation. However, for the sake of simplicity, the invention will be presented in detail in connection with the translation of a continuous-wave signal which is frequency-modulated.

While such a signal may be translated and detected by conventional and well-known frequency-modulation receivers, having suitable amplitude-limiter and discriminator components, considerable improvement results from the use of an essentially different receiver referred to here, for convenience, as a "sampled" or "pulse-modulated" receiver. The sampling or pulse-modulation phenomena may be introduced by including in the receiver a pulse-modulated amplifier which amplifies and passes on a received signal only during recurrent pulse intervals of exceedingly short duration. Although the usual type of amplifier may be controlled by a pulse-modulation signal to exhibit this sampled or pulse-modulated mode of signal translation, it is especially desirable to use a superregenerative amplifier operated in the logarithmic mode which is inherently a pulse-modulated stage having a pulsing frequency corresponding to its quench frequency. The outstanding advantages flowing from the use of a superregenerative amplifier or "superregenerator" in the novel frequency-modulation receiver of the present invention are: (1) unusually high gain and improved sensitivity; (2) improved selectivity which is readily controllable; and (3) automatic amplitude limiting so long as the logarithmic mode of operation is employed. However, in order fully to realize all of those advantages, certain optimum operating conditions are to be observed.

The need for optimum operating conditions becomes apparent when it is recognized that a superregenerator produces a pulse-modulated output signal modulated at the quench frequency. That output signal may be analyzed and shown to have a radiation, or energy pattern including pulse-modulation components spaced from one another in the frequency spectrum by the quench frequency and angular-velocity-modulated in accordance with the modulation of a received signal. This use of the superregenerator is seen to be analogous to a modulating process, producing multiple side bands of the same composition and having modulation components uniformly spaced from one another by the quench frequency. It may be shown that audible noise components are contributed by each of the multiple side bands and the aggregate noise disturbance introduced by the multiband phenomena, unless avoided by optimum operating conditions to be recited hereinafter, reduces the signal-to-noise ratio of the frequency-modulation receiver by as much as 30 decibels relative to its ideal or potential value.

A prior receiver of the sampled or pulse-modulated type utilizes a fixed and sharply tuned selector to select only one of the pulse-modulation components of a superregenerator for application to a detector. In order to isolate a particular component from its neighbors in the radiation pattern of the superregenerator, this prior arrangement is necessarily limited to the use of a quench frequency having a theoretical value at least equal to the maximum frequency swing of the frequency-modulated carrier-wave signal but requiring in practice a very much higher quench frequency of two or more times this theoretical value. This high quench frequency is undesirable because it greatly reduces the selectivity of the superregenerator and requires an additional selector to be placed ahead of the superregenerator in order to achieve a useful over-all selectivity. Further, it causes the superregenerator to be susceptible to ringing or carry-over since at high quench frequenices the oscillations generated in any one quench cycle may not be completely damped prior to the next succeeding negative conductance interval in which another burst of oscillations is generated.

It is an object of the present invention, therefore, to provide a receiver for translating angular-velocity-modulated wave signals which avoids the aforementioned limitations of prior arrangements.

It is another object of the invention to provide a new and improved angular-velocity-modulated wave-signal receiver having a high signal-to-noise ratio.

It is a further object of the invention to provide a new and improved superregenerative receiver for translating an angular-velocity-modulated wave signal, and one which exhibits narrow-band selectivity as well as freedom from ringing effects.

In accordance with the invention, a system for translating an applied angular-velocity-modulated carrier-wave signal comprises means for sampling the applied signal during successive sampling intervals to develop a pulse-modulated signal having angular-velocity-modulation components corresponding to the modulation of the applied signal. The system includes detector means having a given reference frequency for deriving the angular-velocity-modulation components of the pulse-modulated signal to provide a control signal varying with the instantaneous frequency of the applied signal. Control means are included in the system for adjusting an operating characteristic thereof to determine the cumulative phase shift of the pulse-modulated signal relative to the reference frequency in the period between successive ones of the sampling intervals. There is a control circuit coupled between the detector means and the control means for applying the aforesaid control signal to the control means so to adjust the aforementionel operating characteristic that variations in the aforesaid cumulative phase shift are less than $\pm 180$ degrees in each one of a series of sampling intervals.

For a better understanding of the present invention, together with other and further objects thereof, reference is had to the following description taken in connection with the accompanying drawings, and its scope will be pointed out in the appended claims.

Figure 1:
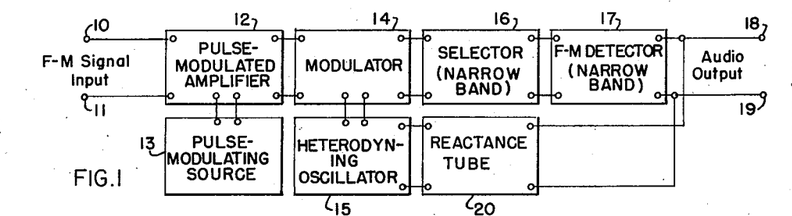
Fig. 1 is a schematic representation of a frequency-modulation signal-translating system including the invention in one form.

Referring now more particularly to Fig. 1, the system there represented may be considered as a receiver for translating a received angular-velocity-modulated wave signal which will be understood, for the purpose of this description, to be a frequency-modulated signal having a given maximum frequency swing. As here used, the expression "maximum frequency swing" is intended to mean the difference between the maximum and minimum values of frequency of the received signal during any interval when it is frequency-modulated with a modulation signal of maximum amplitude. This receiver has input terminals 10 and 11 to which the received signal may be applied from any convenient source, such as an antenna system. Terminals 10 and 11 are connected to one input circuit of a pulse-modulated amplifier 12 with which is associated a pulse-modulating source 13. As previously indicated, unit 12 may comprise a conventional radio-frequency amplifier and the source 13 in that case is a pulse generator which supplies a pulse-modulation signal to a control electrode of one or more of the amplifying tubes of unit 12 to effect pulse-modulated amplification. Preferably, however, unit 12 is a superregenerative amplifier operated in the logarithmic mode and will be considered as such thereinafter. Unit 13 then designates the quench-frequency source which gives rise inherently to pulse modulation of the amplifier at a pulsing frequency corresponding to the quench frequency. In either case, the pulsing frequency may have any value within a wide frequency range and, in particular, may be selected to have a value not exceeding the maximum frequency swing of the received signal. As will be explained more fully hereinafter, the output signal of the superregenerator is a pulse-modulated wave signal including pulse-modulation components which are individually angular-velocity-modulated in accordance with the modulation of the received signal.

Connected to the output circuit of superregenerative amplifier 12 is a wide-band modulator 14 and an associated heterodyning oscillator 15. Connected in cascade with the output circuit of modulator 14 are a band-pass selector 16 and a frequency-modulation detector 17, shown separately although the selector may be a portion of the detector. The units 16 and 17 together constitute frequency-selective detector means for selecting at least one of the pulse-modulation components developed by superregenerative amplifier 12 and for providing an individual angular-velocity-modulation detection characteristic for each such selected component for deriving the velocity-modulation components of the received signal. A utilizing circuit may be connected with output terminals 18, 19 which receive the output signal from detector 17. It is convenient for the purposes of this description to consider selector 16 and detector 17 as narrow-band stages constructed to select a particular one of the pulse-modulation components developed by superregenerative amplifier 12 and to provide a detection characteristic for that selected component alone. In order to avoid distortion, the pass bands of selector 16 and detector 17 are chosen to be narrow relative to the maximum frequency swing of the received signal and to have mean values corresponding to the mean frequency of the selected pulse-modulation component.

Also, to achieve high fidelity, the receiver has means responsive to frequency deviations of the received signal for maintaining the response from the detection characteristic of detector 17 predominantly that due to the selected pulse-modulation component chosen by selector 16. As here used, the expression "maintaining the response from the detection characteristic predominantly that due to the selected pulse-modulation component" means that the detector output signal resulting from that particular component is very much greater than any output produced by other components which may concurrently make their way to the detector. The means for maintaining this desired response in the Fig. 1 embodiment comprises a reactance tube 20 which has an input circuit coupled to the output circuit of detector 17 and has an output circuit coupled with heterodyning oscillator 15 to control the operating frequency of the heterodyning oscillator in a manner to be described more fully hereinafter.

The individual components of the receiving system may be of any well-known design and construction and, therefore, have been represented by block diagram. The operating characteristics of such components are well known to the art, rendering a detailed description thereof unnecessary. In considering the operation of the receiver as a whole, it will be assumed initially that superregenerative amplifier 12 has a selectivity or band-width characteristic wide enough to accept the frequency-modulated signal applied to terminals 10 and 11 and centered about a mean frequency approximately corresponding to the mean carrier frequency of the received signal. It will also be assumed that source 13 establishes a quenching or pulsing rate high relative to the highest frequency-modulation component of the received signal, preferably being at least twice as high as this component. For the assumed conditions, amplifier 12 periodically amplifies the received signal during short time-spaced pulse intervals occurring at a rate determined by source 13. In view of this pulsing action, the receiver may be thought of as sampling the received signal during each pulse interval. This method of sampling or pulse-modulated translation of the received signal develops in the output circuit of amplifier 12 a pulse-modulated wave signal.

Figure 2:
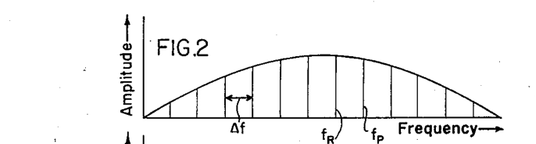
Figs. 2, 3 and 4 comprise curves utilized in explaining operating characteristics of such a system.

The curve of Fig. 2 represents the energy, or radiation, pattern of this pulse-modulated output signal of amplifier 12. The frequency designation $f_R$ is intended to denote the mean carrier frequency of the received signal. The ordinate lines extending from the axis of abscissa to the curve represent the amplitudes of a series of pulse-modulation components distributed throughout the frequency spectrum with a separation $\Delta f$ between succeeding components, the separation $\Delta f$ being equal to the pulsing frequency. It may be shown that the phase of the oscillation during the saturation pulse in any negative conductance interval of the superregenerator is dependent upon the phase of the received signal at the start of that interval. A consideration of this phenomenon appears in the technical literature. See, for example, an article entitled "Some notes on superregeneration with particular emphasis on its possibilities for frequency modulation," by Henry P. Kalmus, appearing in the October, 1944 issue of the Proceedings of the Institute of Radio Engineers at pages 591–600. Therefore, each of the pulse-modulation components included within the radiation pattern of the superregenerator is angular-velocity-modulated or frequency-modulated in the same sense, in accordance with the modulation of the received wave signal. Any one of these components may be detected to derive the modulation components of the received signal. This is accomplished by the remaining units of the system.

The modulator 14 and heterodyning oscillator 15 convert the frequencies of the several pulse-modulation components of the superregenerator output signal to another portion of the frequency spectrum, selected relative to the pass band of selector 16 so that a particular component, such as that designated $f_P$ of Fig. 2, has a mean frequency corresponding to that of the selector. The selector passes component $f_P$ to detector 17 where the modulation components are derived and supplied to output terminals 18, 19.

It will be appreciated that where the pulsing or quenching frequency does not exceed the maximum frequency swing of the received signal, the selected component $f_P$ may have instantaneous values which at times overlap the permissible frequency swings of its adjacent components. Therefore, reactance tube 20, or some equivalent arrangement, is provided to avoid possible interference from the neighboring components. The output of detector 17 is applied to reactance tube 20 which causes the operating frequency of the heterodyning oscillator 15 to vary with frequency deviations of the selected pulse-modulation component $f_P$ and, therefore, also with deviations in frequency of the received signal. The variations in the operating frequency of oscillator 15 reduce or "crush" at the output of modulator 14 the range of frequency deviations of all of the pulse-modulation components including the selected component $f_P$, causing the deviations of the selected component to fall within a range encompassed by the pass band of selector 16 and detector 17. The pass bands of units 16 and 17 are narrow relative to the frequency spacing $\Delta f$ to exclude any significant response from those pulse-modulation components which are adjacent the selected component $f_P$, producing the desired modulation components at terminals 18, 19 substantially free of distortion.

In a system of the type just described, the output signal of superregenerative amplifier 12 is related to the phase rather than the frequency of the received signal in any sampling or pulse interval. It may be shown that a phase ambiguity arises if the phase shift of the signal input to the detector system between successive sampling intervals, relative to a reference frequency, varies more than ±180 degrees from a reference phase shift, where the reference referred to is oscillations occurring at the mean frequency of selector 16 and the reference phase shift is 0° or an integral multiple of approximately 360°. That ambiguity may be avoided by using substantial deviation ratios. The deviation ratio is the ratio of the peak deviation of the received signal to the maximum audio frequency and systems of the type under consideration may use a deviation ratio at least equal to unity.

The frequency-modulation transmission utilized in present day commercial broadcast practice has a maximum frequency swing of 150 kilocycles. Consequently, the pulsing frequency of the proposed receiver may be 150 kilocycles or higher and may be as low as 20 kilocycles, depending upon the audio information being transmitted and the fidelity required. This wide permissible range of pulsing frequencies clearly shows that, where the sampling is effected by a superregenerative amplifier, quench rates of the order of 50 to 100 kilocycles are quite permissible. The advantage of this resides in the fact that quench frequencies in the range of 50 to 100 kilocycles for frequency-modulation reception of commercial broadcast transmissions provide maximum advantage for the superregenerator, namely, narrow band width or high selectivity, and at the same time freedom from ringing or hang-over. More fully to explain the operation of the Fig. 1 receiver, consider for the moment that an unmodulated received signal is applied to the superregenerative amplifier 12. It will be assumed that the received signal has such a frequency that the pulse-modulated signal developed in the output circuit of the modulator 14 has a frequency differing by the quench frequency from the center or reference frequency of the pass band of the detector system 16, 17. Since the detector system 16, 17 comprises narrow band stages, each pulse of the pulse-modulated signal applied to that system causes ringing to occur therein during the periods between the applied pulses. This ringing or hang-over oscillation occurs at the reference frequency of the detector system.

The cumulative phase shift of the pulse-modulated input signal to the detector system 16, 17, relative to the reference frequency thereof, during a quench period is the phase shift of the input signal to the detector system relative to the hang-over oscillation during the quench period. This phase shift is approximately 360° under the assumed operating condition. It may be seen that a variation in the frequency of the input signal to the selector 16 will cause a variation in the cumulative phase shift during a quench period. It also will be understood that a cumulative phase shift of approximately 360° of the input signal to the detector system 16, 17, relative to the reference frequency thereof, during a quench period cannot be distinguished by the detector 17 from a cumulative phase shift of approximately 0° since in both cases the input signal to the detector system 16, 17 and the hangover oscillation therein have the same phase relation in a sampling interval.

When the cumulative phase shift of the input signal to the detector system 16, 17 may vary during a quench period more than ±180° from a reference phase shift, a negative variation in phase shift more than 180° from the reference phase shift cannot be distinguished by the detector 17 from a corresponding positive variation in phase shift less than 180° from the reference phase shift. This will be made clear by the consideration of an example. Assume that a carrier-frequency deviation causes the frequency of the received signal to decrease. The cumulative phase shift of the input signal to the detector system, relative to the reference frequency thereof, then may vary during a quench period −270° from the reference phase shift of approximately 360°. Similarly, when a frequency deviation causes the frequency of the input signal to the detector to increase, the cumulative phase shift may vary +90° from the reference phase shift during a quench period. The variation in cumulative phase shift of −270° from the reference phase shift appears the same to the detector 17 as the variation in cumulative phase shift of +90° from the reference phase shift. Consequently, under such operating conditions, the detector cannot determine whether the frequency of the received signal deviated above or below the carrier frequency. If the cumulative phase shift of the received signal always varies less than ±180° from the reference phase shift during a quench period, however, a given variation in the cumulative phase shift from the reference phase shift during a quench period can only be caused by a frequency deviation in a given sense.

The frequency of the input signal to the detector system 16, 17 is under the control of the reactance tube 20. The reactance tube 20 so adjusts the operating frequency of the heterodyning oscillator 15 that the cumulative phase shift of the input signal to the detector system 16, 17, relative to the reference frequency thereof, during each of a series of quench periods varies less than ±180° from the reference phase shift. In other words, variations in the cumulative phase shift in the period between successive sampling intervals are less than ±180° in each of a series of sampling intervals.

Under the assumed operating condition in which the input signal to the detector system 16, 17 has a frequency which differs by the quench frequency from the reference frequency, the reference phase shift from which variations are measured is approximately 360°. If the input signal to the detector, however, has a frequency which is approximately equal to the reference frequency, the reference phase shift from which variations are measured is 0°. Accordingly, the reference phase shift from which variations in cumulative phase shift are measured may be 0° or any integral multiple of approximately 360° as determined by the operating conditions of the receiver.

Figure 3:
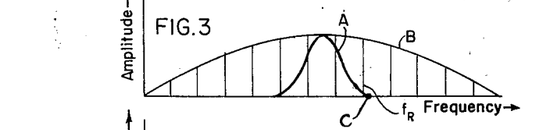

Another interesting aspect of the proposed receiver may be understood with reference to the curves of Fig. 3 in which curve A represents the selectivity of unit 12, assuming that unit to be a superregenerative amplifier, and curve B is the radiation pattern. It will be noted that the radiation pattern extends over a frequency band which substantially overlaps and is approximately symmetrical relative to the acceptance band or selectivity of the receiver. This is advantageous from the standpoint of tuning because, if the mean carrier frequency of the received signal is initially at the point C of the selectivity curve and the pulse-modulation component supplied to detector 17 is assumed for the moment to be the component $f_R$, then the tuning may be adjusted over the selectivity characteristic while keeping the selected component $f_R$ in a region of the radiation pattern which represents appreciable energy. Otherwise, it is possible under certain operating conditions to have the detector track a component which may be shifted with tuning to a point where the radiation pattern has very little, or no, energy. In that case the detector loses the selected component and switches over to another, but the switchover is accompanied by an undesirable audible click in the receiver. Providing radiation and selectivity characteristics of the type shown in Fig. 3 avoids any such loss of the selected component with tuning because a component may be chosen which remains within a portion of the radiation pattern representing substantial energy while tuning over the response or selectivity range.

A method of shaping the selectivity and radiation characteristics is apparent when it is recognized that amplifier 12, if of the superregenerative type, essentially comprises a regenerative oscillatory circuit and quench source 13 varies the conductance of that circuit to have positive and negative values during alternate operating intervals to provide superregeneration. The selectivity is controlled by the rate of change of conductance near zero conductance and during the swing from a positive to a negative value. A slow rate of change is necessary for sharp selectivity of the superregenerator and is readily obtained by utilizing a blocking oscillator for the source 13. The radiation pattern, on the other hand, is determined by the duration of the saturation pulse, that is, by the duration of the interval when the superregenerator operating in a logarithmic mode generates oscillations of saturation-level amplitude. The pulse duration is conveniently adjustable by varying the parameters of the blocking tube oscillator and the superregenerator and is preferably made short to achieve a radiation pattern wide compared to the selectivity characteristic. Characteristics of the type represented in Fig. 3 may also be achieved for pulsed conventional amplifiers so long as the amplifier is preceded by a narrow-band selector to establish the selectivity curve A.

Figure 4:
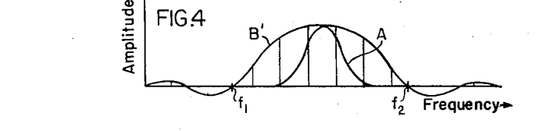

The preceding discussion has been predicated upon the assumption that the pulse output of unit 12 in any pulse interval has a smooth envelope of the type represented in Fig. 2. In some instances, it may be desirable to utilize a conductance variation in response to which the amplifier develops a pulse of approximately rectangular wave form in any pulse interval. Where the conductance variation is of that type, the radiation characteristic may be as represented by curve B' of Fig. 4, curve A of that figure again designating the selectivity. It is seen that null points are established at frequencies $f_1$, $f_2$. To avoid distortion, the pulse duration preferably is such that the frequency separation of the null points is at least equal to the maximum frequency swing of the received signal. As a practical matter, a much greater frequency separation of the null points is necessary if the tuning is not to be critical. For these reasons, it is preferred that the conductance variations of pulsed amplifier 12 be selected to give output pulses which have smooth, narrow envelopes so that the advantages resulting from the characteristic curves of Fig. 3 may be obtained with the greatest ease.

Figure 5:
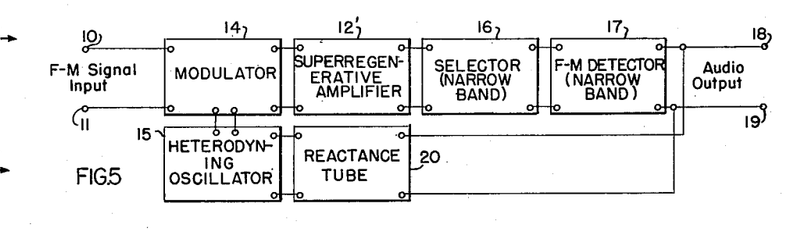
Figs. 5–8, inclusive, individually represent modified forms of frequency-modulation translating systems in accordance with the invention.

The modification of Fig. 5 is generally similar to that of Fig. 1 and corresponding components thereof are identified by the same reference characters. In Fig. 5, however, the oscillator-modulator 14, 15 precedes the superregenerative amplifier 12' so that the crushing of the frequency deviations occurs prior to the pulsed amplification of the received signal. Otherwise, the arrangement operates in a manner generally similar to that described in connection with Fig. 1. It should be noted that unit 12' has been labeled a superregenerative amplifier and it will be understood that this unit includes a quench source, whether that source be separate from the regenerative circuit or be included in the regenerative circuit as a self-blocking arrangement.

Figures 6, 8:
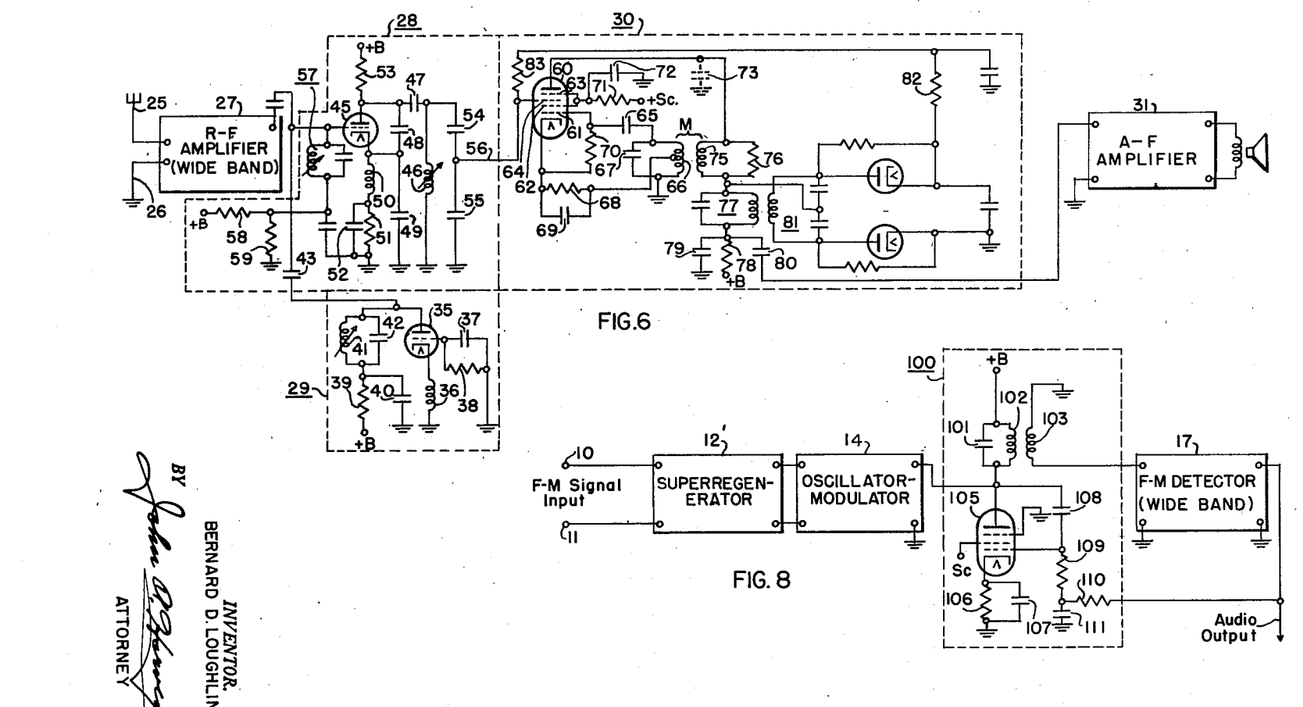

Another modification in which the deviation of the frequency modulation is crushed to permit the desired selection of a particular one of the pulse-modulation components is represented in the partially diagrammatic circuit arrangement of Fig. 6. Here an antenna-ground system 25, 26 is coupled to the input circuit of a wide-band radio-frequency amplifier 27. The output circuit of amplifier 27 is coupled to a combined superregenerative superheterodyne stage 28 with which there is associated a heterodyning oscillator 29. A frequency-selective detector 30, including a fast automatic-frequency-control (A. F. C.) system for crushing the deviations, is coupled to the output circuit of unit 28. Finally, an audio-frequency system including an amplifier 31 and sound-signal reproducing device is connected to the output circuit of detector 30.

Briefly, the operation of the Fig. 6 arrangement is as follows. A frequency-modulated wave signal intercepted by antenna system 25, 26 is selected and amplified in radio-frequency amplifier 27 and converted into a pulse-modulated intermediate-frequency signal through the superregenerative superheterodyne function of units 28 and 29. The pulse-modulated intermediate-frequency signal is supplied to frequency-selective detector 30 which performs a second conversion and simultaneously detects the modulation components of a selected one of the pulse-modulation components of the intermediate-frequency signal obtained from unit 28. The detected modulation components are supplied to audio-frequency system 31 for further amplification and reproduction. The A. F. C. system of detector 30 crushes the deviations of the selected pulse-modulation component so that the response of the detector remains substantially only that due to the particular selected component.

The heterodyning oscillator 29 comprises a triode vacuum tube 35 having a cathode grounded through a signal-frequency choke 36. The control electrode is grounded through a grid condenser 37 and a resistor 38. The anode of tube 35 connects to a source of space current +B through a frequency-determining circuit and an anode resistor 39, by-passed for signal frequencies by a condenser 40. The frequency-determining circuit includes an inductor 41 and a parallel-connected condenser 42, the latter being comprised in whole or in part of the capacitance to ground of the anode and wiring stray capacitance effects. The frequency-determining circuit is adjustable, as indicated by the arrow, to determine the operating frequency of the heterodyning oscillator. A condenser 43 applies an output signal from the oscillator to the control electrode of a triode vacuum tube 45 included in the superregenerative superheterodyne unit 28.

Considering initially the superregenerative aspects of unit 28, tube 45 is included in a regenerative oscillatory circuit, the operating frequency of which is determined by an inductor 46 and the capacitance represented by condensers 47, 48 and 49. The operating frequency of the regenerative oscillatory circuit may be adjusted as indicated by the arrow associated with inductor 46. The anode of tube 45 is connected to the junction of condensers 47 and 48. The cathode is directly connected to the junction of condensers 48 and 49 and is grounded through a radio-frequency choke 50 and a stabilizing arrangement provided by a resistor 51 by-passed by a condenser 52, more fully described in a copending application of B. D. Loughlin, Serial No. 753,236, filed June 7, 1947, now Patent 2,617,928 granted November 11, 1952. In this manner, the frequency-determining circuit 46, 47, 48 and 49 is coupled to the tube 45. The input circuit of tube 45 includes a radio-frequency selector 57 and a biasing arrangement comprising resistors 58 and 59 and a source +B. The anode is also connected with a space-current source +B through an anode decoupling resistor 53. A capacitive-type voltage divider provided by condensers 54 and 55 is utilized to derive an output signal, supplied by a conductor 56 to the frequency-selective detector 30.

The operation of a superheterodyne superregenerative receiver of the type comprised by units 28 and 29 is fully described in a copending application of B. D. Loughlin, Serial No. 788,570, filed November 28, 1947, now Patent 2,588,022 granted March 4, 1952. It will be explained here only briefly.

Unit 29 operates as a conventional oscillation generator and supplies a heterodyning signal to the input circuit of tube 45 in unit 28. The conductance of this tube is determined jointly by condenser 47 and stabilizing circuit 51, 52. During operating intervals in which the tube is conductive, the applied wave signal from unit 27 and the heterodyning signal from unit 29 are mixed within tube 45 by virtue of a nonlinear operating characteristic of the latter during certain portions of each quench cycle and the mixing action is such as to develop in the anode circuit of tube 45 an angular-velocity-modulated intermediate-frequency wave signal. As will presently become apparent, the resonant circuit 46—47—48—49 is tuned to this intermediate frequency and is effective to provide superregenerative amplification of the developed intermediate-frequency wave signal. The operating intervals in which this occurs are determined as follows.

Condenser 47 is charged from source +B through anode load 53 and inductor 46. When the charge on the condenser supplies a sufficiently high potential between the anode and cathode of tube 45, the tube is rendered conductive and operates as an oscillation generator at the operating frequency of the circuit 46—47—48—49. During the saturation interval, the space current of the tube is taken in large part from condenser 47 and, when the charge on the condenser has been reduced to decrease the anode-cathode potential of tube 45 to a low value, the tube is blocked. This action may then be thought of as superregenerative action of the plate-circuit blocking type in which the characteristic negative conductance intervals are those wherein condenser 47 causes tube 45 to be conductive, while the positive conductance intervals are the intermediate ones in which tube 45 is blocked. The stabilizing circuit 51, 52 stabilizes the superregenerative action to have a substantially constant average quench frequency which, if desired, may be chosen to have a value not exceeding the maximum frequency swing of the received frequency-modulated carrier-wave signal. It will be apparent from the explanations already set forth that the superrenegerative action develops pulse-modulation components having a frequency separation equal to that of the quench frequency and individually angular-velocity-modulated in accordance with the received signal. The heterodyning feature merely converts these components to an intermediate-frequency wave signal of the same type, having pulse-modulation components angular-velocity-modulated in a manner to represent the modulation of the received signal.

The frequency-selective detector 39, which responds to the translated intermediate-frequency pulse-modulated signal, comprises a vacuum tube 60 similar in many respects to the well-known pentagrid converter. It has a cathode, an anode and at least three intermediate electrodes. As shown, the system of intermediate electrodes includes a first grid 61, a pair of screen grids 62 and 63 and a second control grid 64. The cathode, first control grid 61 and screen grid 62 are connected to provide a class C oscillation generator. To this end, grid 61 is connected through a condenser 65 to a parallel-resonant circuit provided by an inductor 66 and a condenser 67. A self-biasing resistor 68 by-passed by a condenser 69 connects the cathode to a tap on inductor 66 while a resistor 70 is connected directly between the grid 61 and cathode. Screen 62 is connected to a space-current source +Sc through a resistor 71 by-passed by a condenser 72. The described circuit connections constitute an oscillation generator of the Hartley type in the detector.

The anode of tube 60 is connected with a first tuned circuit which is heavily damped for broadband response. This tuned circuit is provided by an inductor 75 tuned approximately to the resonant frequency of elements 66, 67 by a condenser 73 shown in broken-line construction to connote the capacitance to ground of the anode of tube 60 and damping is accomplished by a resistor 76. Inductors 66 and 75 have a magnetic coupling so that a quadrature-phase voltage component may be supplied from the tuned circuit of the anode to the tuned circuit of the oscillation generator to determine the frequency of the generated oscillations. The second control grid 64 is connected by way of conductor 56 to the superheterodyne superregenerator so that the intermediate-frequency pulse-modulation components are applied to the detector arrangement 30.

A primary tuned circuit 77 of a conventional frequency-modulation detector connects the anode of tube 60 through inductor 75 and a load resistor 78 to a space-current source +B. Resistor 78 is by-passed by a condenser 79 to constitute the usual de-emphasis filter. The audio-frequency output is derived across load resistor 78 and is supplied through a condenser 80 to the audio-frequency system 31. A secondary tuned circuit 81 coupled to primary tuned circuit 77 comprises the input circuit of a conventional automatic-frequency-control system and the output of that system is supplied through resistors 82 and 83 to the second control grid 64 of tube 60.

In considering the operation of unit 30, the effect of its automatic-frequency-control arrangement will be neglected initially and it will be assumed that the tube 60 operates with a fixed bias on its control electrode 64. The cathode and first two intermediate electrodes along with their associated circuit elements comprise a well-known continuous-wave oscillator. Current flow occurs in the electrode system of the oscillator periodically and occasions a related flow of current in the anode-cathode circuit of tube 60. In view of the coupling of inductors 66 and 75, current flow in the anode-cathode circuit of tube 60 introduces a component of quadrature-phase feed-back voltage into the oscillator. The magnitude of this component, relative to that of the other signal components in the oscillator, determines the oscillating frequency. For the assumed condition of fixed operating biases, the relative amplitudes of the signal components are fixed and, therefore, the oscillator functions at a constant operating frequency.

When a radio-frequency signal is supplied to control electrode 64 of tube 60, as for example the intermediate-frequency output signal of superheterodyne superregenerator 28, electron mixing within the tube effects a conversion which produces a second intermediate-frequency signal, namely, the sum or difference frequency of the output signal of the oscillator section of tube 60 and the signal applied to its control electrode 64 from unit 28. Hence, for the assumed conditions of fixed bias the circuit arrangement of tube 60 constitutes a frequency converter, including its own heterodyning oscillator and developing an output signal, referred to as a second intermediate-frequency signal. The frequency of this output signal follows the frequency excursions of the heterodyned signals and, since unit 28 delivers a frequency-modulated signal to control electrode 64, the output signal of tube 60 is likewise frequency-modulated. The signal output of tube 60 is applied to the frequency-modulation detector including the discriminator circuit 77 and 81. The modulation components developed in the detector are supplied through resistor 82 to control electrode 64 of tube 60 as an A. F. C. potential.

The A. F. C. potential is unidirectional and, as applied to control electrode 64, is analogous to a bias. It is effective to vary the anode-cathode current of tube 60 in accordance with the frequency deviations of the received signal and thereby to vary the magnitude of the quadrature-phase feed-back component of the oscillator section of tube 60. The operating frequency of the oscillator is modified accordingly and as a result the frequency deviations of the anode-cathode current of tube 60 are crushed to remain within the pass band of selector 77, 81 of the A. F. C. system. Obviously, the modulation components of the received signal may be obtained from the detector circuit of the A. F. C. system but, in view of the application of the A. F. C. potential to control electrode 64 of tube 60, the fundamental component of anode-cathode current of that tube also represents the modulation components of the received signal. In Fig. 6, the audio-frequency output is derived across load resistor 78 in the anode-cathode circuit of tube 60 and is delivered to the audio-frequency system 31.

Unit 30 which has been described as a frequency-selective detector is in the nature of a converter-reactance-detector device because electron conversion is realized, a simulated reactance is provided by the quadrature-phase feedback supplied by inductors 66, 75 to effect frequency deviations, and the fundamental component of anode current produces a potential variation representing the detected modulation components.

The primary and secondary selectors 77 and 81 of the A. F. C. system are chosen so that the signal output of the A. F. C. system has sufficient amplitude to accomplish the desired crushing or suppressing of frequency deviations necessary to permit the detector to follow a particular pulse-modulation component of the first intermediate-frequency signal applied thereto from unit 28. In some applications, it may be desirable to have the primary selector 77 a low-Q circuit and the secondary selector 81 a high-Q circuit. Where the Q's of the selectors are related in the manner indicated, an immediate change is observed in the output signal of the A. F. C. system in the presence of a large phase variation between successive pulse intervals. This may be relied upon more effectively to crush the frequency deviations and accommodate phase variations between pulse intervals within the range of ±180 degrees.

By way of illustrating a practical embodiment of the invention, the following circuit-component values are given for one of the Fig. 6 type:

| Superregenerator 28 | Frequency-Selective Detector 30 |
|---|---|
| Tube 45, ½ of a Type 12AT7. | Tube 60, Type 6BE6. |
| Inductor 46, resonant at 18 megacycles with condensers 47, 48, 49. | Condenser 65, 100 micro-microfarads. |
| Condenser 47, 250 micro-microfarads. | Condenser 69, 0.001 microfarad. |
| Condenser 48, 20 micro-microfarads. | Condenser 72, 0.01 microfarad. |
| Condenser 49, 20 micro-microfarads. | Condenser 79, 0.001 microfarad. |
| Condenser 52, 0.01 microfarad. | Inductor 66, resonant at 22 megacycles with condenser 67. |
| Condenser 54, 2 micro-microfarads. | Inductor 75, resonant at about 22 megacycles with stray capacity 73. |
| Condenser 55, 20 micro-microfarads. | Resistor 68, 120 ohms. |
| Resistor 51, 4,700 ohms. | Resistor 70, 22,000 ohms. |
| Resistor 53, 22,000 ohms. | Resistor 71, 15,000 ohms. |
| +B source, 250 volts. | Resistor 78, 22,000 ohms. |
| Quench frequency, 75 kilocycles. | Resistor 82, 1 megohm. |
| 1st intermediate frequency, 18 megacycles. | Resistor 83, 1,000 ohms. |
| | 2nd intermediate frequency, 3 megacycles. |

The embodiments of Figs. 1, 5 and 6 maintain the detector response predominantly that due to a particular pulse-modulation component by controlling a heterodyning oscillator with a fast A. F. C. potential to crush the frequency deviations of the selected component. Selectivity of a similar type, discriminating in favor of one particular pulse-modulation component, may arise by appropriate control of the pulsing frequency in an arrangement such as that represented in Fig. 7. This arrangement is generally similar to that of Fig. 1 and corresponding components have related reference characters, but it is noted that unit 12' is now designated a superregenerator and unit 13' is a separate quench-frequency oscillator. Reactance tube 20 responds to the signal output of detector 17 to control the operating frequency of quench oscillator 13'.

Figure 7:
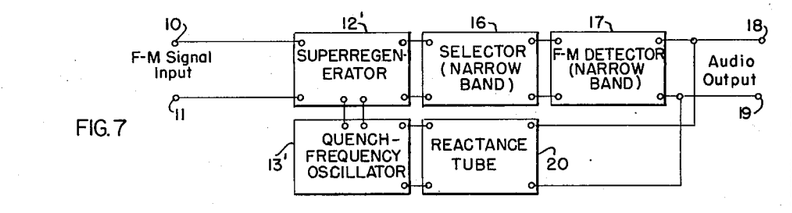

In considering the operation of the arrangement of Fig. 7, reference is made to the curve of Fig. 2. This curve represents the radiation pattern of the superregenerative amplifier and, as previously explained, shows the distribution of the pulse-modulation components developed. These components have a separation which is equal to the quench frequency, and their separation may be adjusted by controlling the quench frequency. To that end, reactance tube 20 responds to the signal output of detector 17, utilizing that signal as an automatic-frequency-control potential to control the quench frequency in accordance with the modulating signals carried by the received modulated carrier-wave signal. The quench frequency is varied to restrict the frequency deviations of a selected side pulse-modulation component of the radiation pattern, that is, one of the radiation components other than that corresponding to the frequency of the received signal. Its frequency deviations are crushed to remain always within the pass band of selector 16 which responds substantially only to the desired side component. It may be advantageous in certain applications of the Fig. 7 embodiment to position an oscillator-modulator between the superregenerator 12' and the narrow-band selector 16 to protect the superregenerator from the adverse effects of any tendency toward ringing which might be created by the use of the narrow-band selector.

In the several modifications thus far described, the frequency-selective detector is able to produce a response substantially only to a selected one of the pulse-modulation components developed by the pulse amplifier because of a crushing of the frequency deviations of the selected component so that its instantaneous frequency is always within the pass band of the detector and its associated selector. A similar result may be obtained by employing a wide-band detector preceded by a tracking narrow-band selector as represented in the embodiment of Fig. 8. In this figure the input terminals 10, 11 are connected with a superregenerative amplifier 12' to which is coupled the oscillator-modulator 14. The detector 17 is of the wide-band type, having a band width at least equal to the maximum frequency swing of the received signal. Its input circuit is connected to the output circuit of oscillator-modulator 14 through a tracking selector 100, having a pass band narrow relative to the maximum frequency swing of the received signal.

Selector 100 includes a tuned circuit 101, 102 directly connected with the output circuit of oscillator-modulator 14 and inductively coupled through an inductor 103 to the input circuit of detector 17. Tracking of the tunable selector 100 is accomplished by a well-known form of reactance tube, provided by a pentode tube 105. The cathode of this tube is grounded through a self-biasing resistor 106 and a by-pass condenser 107 while its anode is directly connected with tuned circuit 101, 102. A phase-shifting circuit, including a condenser 108 and resistor 109, is provided in the usual way, the condenser being directly connected between the anode and first control electrode of the tube. The output signal of detector 17 is supplied through a resistor 110 and condenser 111 to the input circuit of the reactance tube 105.

In the operation of the Fig. 8 embodiment, selector 100 has a normal resonant frequency equal to the mean frequency of a selected pulse-modulation component derived from superregenerator 12' and converted to a suitable frequency in oscillator-modulator 14. The selected component is translated through selector 100 to detector 17 and the control of reactance tube 105 in response to the signal output of the detector causes the tuning of selector 100 closely to track the frequency deviations of the selected pulse-modulation component. The tracking circuit has a fast time constant and since the selector has a narrow band width compared with the maximum frequency swing, it supplies the desired pulse-modulation component to detector 17 to the exclusion of the other pulse-modulation components concurrently developed by the superregenerative action. Oscillator-modulator 14, in this embodiment, protects the superregenerator from any ringing or carry-over which might otherwise arise due to the use of the narrow-band selector 100.

In each of the foregoing arrangements the receiver, especially when sampling device 12 is a superregenerator, exhibits high selectivity and high gain and effects automatic amplitude limiting because saturation is achieved during each of the pulse intervals. Additionally, the pulsing frequency in each instance may, if desired, be maintained at a value not exceeding the maximum frequency swing of the received signal. The use of a relatively low quench frequency enhances both the selectivity and the freedom from ringing effects. Each embodiment further includes an arrangement for maintaining the response of the detector predominantly that due to a selected pulse-modulation component developed by the pulse-modulated amplifying device. This means is necessary when pulsing frequencies not exceeding the maximum frequency swing of the received signal are employed to avoid interference since any such component may then have an instantaneous frequency within a band embracing the permissible frequency deviations of its neighboring components.

All described modifications of the invention avoid the phase ambiguity mentioned in the discussion of Fig. 1 and thus achieve distortionless detection of the received signal. By way of review, the detector 17 of the embodiment of Fig. 1 derives the angular-velocity-modulation components of the received signal to provide a control effect varying with the instantaneous frequency of the received signal. The selector 16, which may be included within the detector, causes the detector system 16, 17 to have a reference frequency corresponding to the center frequency of the selector. The reactance tube 20 constitutes a control means for adjusting an operating characteristic of the receiver, specifically the operating frequency of heterodyning oscillator 15, to determine the cumulative phase of the input signal to the detector relative to the reference frequency thereof in the period between successive ones of the sampling intervals of amplifier 12. The connection from the detector 17 to the reactance tube 20 comprises a control circuit for applying the detected modulation components to the reactance tube as an automatic-frequency-control effect so to adjust the operating frequency of heterodyning oscillator 15 that the variations in the cumulative phase shift are less than ±180 degrees in each of a series of sampling intervals.

As mentioned previously, the expression "cumulative phase shift" within a pulsing cycle refers to the phase shift of the input signal to the detector system, relative to its reference frequency, within a pulsing cycle or within one quench period when unit 12 is a superregenerator. While a single detector 17 supplies the detected modulation components to output terminals 18, 19 and an A. F. C. potential to reactance tube 20, individual detectors for deriving the modulation components of the received signal may be used for these two functions. Also, conventional filters may be utilized to select only desired frequency components in the output circuit of the detector for application as an A. F. C. potential to reactance tube 20.

In the arrangements of Figs. 5 and 6 a phase ambiguity is avoided in essentially the same manner as that featured in Fig. 1. More particularly, in the Fig. 5 embodiment the operating frequency of a heterodyning oscillator is modified to adjust the frequency deviations of the signal input to the detector. The reference frequency of the detector in the Fig. 6 arrangement is determined by the selector 81 which is a high-Q circuit compared with the companion tuned circuit 77.

A different method of obviating the phase ambiguity is employed in the form of the invention represented in Fig. 7 where the reactance tube 20 controls the operating frequency of quench-frequency oscillator 13'. The variations in quench frequency modify the repetition rate of the sampling intervals to maintain changes in the cumulative phase shift to a value less than ±180 degrees from one quench cycle to the next. Control of the quenching frequency by an automatic-frequency-control potential may also be employed in connection with a self-quenching superregenerator, as shown in Fig. 5 of applicant's copending application Serial No. 788,568, filed November 28, 1947, now abandoned.

The modification of Fig. 8 comprises a tunable selector 100 associated with detector 17 and determining the reference frequency of the detector in accordance with the tuning adjustment of the selector. The reactance tube 105, controlled by the A. F. C. potential obtained from the detector, tunes the selector and varies the reference frequency of the detector relative to the mean frequency of the angular-velocity-modulated signal supplied thereto in order to preclude any phase ambiguity.

The receiving systems are not limited to selecting and utilizing only a single one of the developed pulse-modulation components. Where more than one is selected, however, an angular-velocity-modulation detection characteristic is to be effectively supplied for each.

Another receiving system of the type contemplated features a separation in the frequency spectrum of the selective band of the pulse-modulated amplifier and its radiation pattern. Such separation enables the use of very narrow-band selectors while at the same time offering automatic protection for the superregenerator against ringing. An arrangement for accomplishing that result is described in applicant's copending application Serial No. 788,568, referred to previously.

The receivers described have a marked improvement in signal-to-noise ratio over similar receivers heretofore known to the art and approach the signal-to-noise ratio of an ideal frequency-modulation receiver, differing therefrom only by 6-10 decibels.

While there have been described what are at present considered to be the preferred embodiments of this invention, it will be obvious to those skilled in the art that various changes and modifications may be made therein without departing from the invention, and it is, therefore, aimed to cover all such changes and modifications as fall within the true spirit and scope of the invention.

What is claimed is:

1. A receiver for translating a received angular-velocity-modulated carrier-wave signal having a given maximum frequency swing comprising: pulse-modulated means, having a given pulsing frequency not exceeding said maximum frequency swing, for developing from said received wave signal a pulse-modulated wave signal including pulse-modulation components having a frequency separation equal to said pulsing frequency and individually angular-velocity-modulated in accordance with the modulation of said received signal; frequency-selective detector means, having a pass band narrow relative to said maximum frequency swing, for selecting a particular one of said components and for providing an angular-velocity-modulation detection characteristic therefor to derive for application to a utilizing circuit the velocity-modulation components of said received signal; control means responsive to frequency deviations of said received signal for reducing the corresponding deviations of said particular component to a range within said pass band of said detector means; and a control circuit coupled in circuit with said detector means and said control means for applying said derived velocity-modulation components to said control means to control the operation thereof to maintain the response from said detection characteristic substantially only that due to said particular pulse-modulation component.

2. A receiver for translating a received angular-velocity-modulated carrier-wave signal having a given maximum frequency swing comprising: superregenerative amplifying means, having a given quench frequency, for developing from said received wave signal a pulse-modulated wave signal including pulse-modulation components having a frequency separation equal to said quench frequency and individually angular-velocity-modulated in accordance with the modulation of said received signal; frequency-selective detector means, having a pass band narrow relative to said maximum frequency swing, for selecting a particular one of said components and for providing an angular-velocity-modulation detection characteristic therefor to derive for application to a utilizing circuit the velocity-modulation components of said received signal; and means responsive to frequency deviations of said received signal for varying said quench frequency of said superregenerative amplifying means to reduce the corresponding deviations of said particular component to a range within said pass band of said detector means to maintain the response from said detection characteristic substantially only that due to said particular pulse-modulation component.

3. A receiver for translating a received angular-velocity-modulated carrier-wave signal having a given maximum frequency swing comprising: a superregenerative amplifier and a separate quench-frequency oscillator, having a given quench frequency, for developing from said received wave signal a pulse-modulated wave signal including pulse-modulation components having a frequency separation equal to said quench frequency and individually angular-velocity-modulated in accordance with the modulation of said received signal; frequency-selective detector means, having a pass band narrow relative to said maximum frequency swing, for selecting a particular one of said components and for providing an angular-velocity-modulation detection characteristic therefor to derive for application to a utilizing circuit the velocity-modulation components of said received signal; and means responsive to frequency deviations of said received signal for varying the operating frequency of said quench-frequency oscillator to reduce the corresponding deviations of said particular component to a range within said pass band of said detector means to maintain the response from said detection characteristic substantially only that due to said particular pulse-modulation component.

4. A receiver for translating a received angular-velocity-modulated carrier-wave signal having a given maximum frequency swing comprising: pulse-modulated means, having a given pulsing frequency not exceeding said maximum frequency swing, for developing from said received wave signal a pulse-modulated wave signal including pulse-modulation components having a frequency separation equal to said pulsing frequency and individually angular-velocity-modulated in accordance with the modulation of said received signal; a selector, having a pass band narrow relative to said maximum frequency swing, for selecting a particular one of said components; detector means having a band width at least equal to said maximum frequency swing and providing an angular-velocity-modulation detection characteristic for said selected component to derive for application to a utilizing circuit the velocity-modulation components of said received signal; control means responsive to frequency deviations of said received signal for tuning said selector to track said selected component; and a control circuit coupled in circuit with said detector means and said control means for applying said derived velocity-modulation components to said control means to control the operation thereof and maintain the response from said detection characteristic predominantly that due to said selected component.

5. A receiver for translating a received angular-velocity-modulated carrier-wave signal having a given maximum frequency swing comprising: pulse-modulated means, having a pulsing frequency not exceeding said maximum frequency swing, for developing from said received wave signal a pulse-modulated wave signal including pulse-modulation components having a frequency separation equal to said pulsing frequency and individually angular-velocity-modulated in accordance with the modulation of said received signal; a selector, having a pass band narrow relative to said maximum frequency swing, for selecting a particular one of said components; a reactance tube coupled to said selector to effect tuning thereof; detector means having a band width at least equal to said maximum frequency swing and providing an angular-velocity-modulation detection characteristic for said selected component to derive for application to a utilizing circuit the velocity-modulation components of said received signal; and a control circuit for applying said derived velocity-modulation components to said reactance tube to control the tuning of said selector to track said selected component and maintain the response from said detection characteristic predominantly that due to said selected component.

6. A receiver for translating a received angular-velocity-modulated carrier-wave signal having a given maximum frequency swing comprising: pulse-modulated means, having a pulsing frequency not exceeding said maximum frequency swing, for developing from said received wave signal a pulse-modulated wave signal including pulse-modulation components having a frequency separation equal to said pulsing frequency and individually angular-velocity-modulated in accordance with the modulation of said received signal; a wave-signal detector comprising a vacuum tube having an anode, a cathode and at least three intermediate electrodes; means connected to said cathode and to two of said intermediate electrodes for providing an oscillation generator; a tuned circuit connected to said anode and cathode and coupled to said generator for supplying a quadrature-phase voltage component thereto for determining the frequency of the generated oscillations; means for applying at least a particular one of said pulse-modulation components to the third of said intermediate electrodes to develop in said detector a second angular-velocity-modulated signal modulated in accordance with the modulation of said received signal; means responsive to said second signal for deriving the velocity-modulation components of said received signal; control means comprising said third intermediate electrode for adjusting said quadrature-phase component and thus the frequency of said generated oscillations; and a control circuit coupled between said responsive means and said third intermediate electrode for applying said derived velocity-modulation components to said control means so to adjust said frequency of said generated oscillations as to maintain the response of said detector predominantly that due to said one of said pulse-modulation components.

7. A system for translating an applied angular-velocity-modulated carrier-wave signal comprising: means for sampling said signal during successive sampling intervals to develop a pulse-modulated signal having angular-velocity-modulation components corresponding to the modulation of said applied signal; detector means having a given reference frequency for deriving the angular-velocity-modulation components of said pulse-modulated signal to provide a control signal varying with the instantaneous frequency of said applied signal; control means for adjusting an operating characteristic of said system to determine the cumulative phase shift of said pulse-modulated signal relative to said reference frequency in the period between successive ones of said sampling intervals; and a control circuit coupled between said detector means and said control means for applying said control signal to said control means so to adjust said operating characteristic that variations in said cumulative phase shift are less than ±180 degrees in each one of a series of sampling intervals.

8. A system for translating an applied angular-velocity-modulated carrier-wave signal comprising: means for sampling said signal during successive sampling intervals to develop a pulse-modulated signal having angular-velocity-modulation components corresponding to the modulation of said applied signal; detector means having a given reference frequency for deriving the angular-velocity-modulation components of said pulse-modulated signal to provide a control signal varying with the instantaneous frequency of said applied signal; control means for adjusting a frequency characteristic of said system to determine the cumulative phase shift of said pulse-modulated signal relative to said reference frequency in the period between successive ones of said sampling intervals; and a control circuit coupled between said detector means and said control means for applying said control signal to said control means so to adjust said frequency characteristic that variations in said cumulative phase shift are less than ±180 degrees in each one of a series of sampling intervals.

9. A system for translating an applied angular-velocity-modulated carrier-wave signal comprising: means for sampling said signal during successive sampling intervals to develop a pulse-modulated signal having angular-velocity-modulation components corresponding to the modulation of said applied signal; detector means having a given reference frequency for deriving the angular-velocity-modulation components of said pulse-modulated signal to provide a control signal varying with the instantaneous frequency of said applied signal, control means for adjusting the frequency deviations of said pulse-modulated signal to determine the cumulative phase shift of said pulse-modulated signal relative to said reference frequency in the period between successive ones of said sampling intervals; and a control circuit coupled between said detector means and said control means for applying said control signal to said control means so to adjust said frequency deviations of said pulse-modulated signal that variations in said cumulative phase shift are less than ±180 degrees in each one of a series of sampling intervals.

10. A system for translating an applied angular-velocity-modulated carrier-wave signal comprising: means for sampling said signal during successive sampling intervals to develop a pulse-modulated signal having angular-velocity-modulation components corresponding to the modulation of said applied signal; detector means having a given reference frequency for deriving the angular-velocity-modulation components of said pulse-modulated signal to provide a control signal varying with the instantaneous frequency of said applied signal; control means for adjusting the repetition frequency of said sampling intervals to determine the cumulative phase shift of said pulse-modulated signal relative to said reference frequency in the period between successive ones of said sampling intervals; and a control circuit coupled between said detector means and said control means for applying said control signal to said control means so to adjust said repetition frequency that variations in said cumulative phase shift are less than ±180 degrees in each one of a series of sampling intervals.

11. A system for translating an applied angular-velocity-modulated carrier-wave signal comprising: means for sampling said signal during successive sampling intervals to develop a pulse-modulated signal having angular-velocity-modulation components corresponding to the modulation of said applied signal; detector means having a given reference frequency for deriving the angular-velocity-modulation components of said pulse-modulated signal to provide a control signal varying with the instantaneous frequency of said applied signal; control means for adjusting said reference frequency of said detector means to determine the cumulative phase shift of said pulse-modulated signal relative to said reference frequency in the period between successive ones of said sampling intervals; and a control circuit coupled between said detector means and said control means for applying said control signal to said control means so to adjust said reference frequency that variations in said cumulative phase shift are less than ±180 degrees in each one of a series of sampling intervals.

12. A system for translating an applied angular-velocity-modulated carrier-wave signal comprising: means for sampling said signal during successive sampling intervals to develop a pulse-modulated signal having angular-velocity-modulation components corresponding to the modulation of said applied signal; detector means including a tunable selector having a given reference frequency for deriving the angular-velocity-modulation components of said pulse-modulated signal to provide a control signal varying with the instantaneous frequency of said applied signal; control means for tuning said selector to adjust said reference frequency of said detector means to determine the cumulative phase shift of said pulse-modulated signal relative to said reference frequency in the period between successive ones of said sampling intervals; and a control circuit coupled between said detector means and said control means for applying said control signal to said control means so to adjust said reference frequency that variations in said cumulative phase shift are less than ±180 degrees in each one of a series of sampling intervals.

13. A system for translating an applied angular-velocity-modulated carrier-wave signal comprising: a super-regenerative amplifier having a given quenching frequency for sampling said signal during successive sampling intervals to develop a pulse-modulated signal having angular-velocity-modulation components corresponding to the modulation of said applied signal; detector means having a given reference frequency for deriving the angular-velocity-modulation components of said pulse-modulated signal to provide a control signal varying with the instantaneous frequency of said applied signal; control means for adjusting the quenching frequency of said amplifier to determine the cumulative phase shift of said pulse-modulated signal relative to said reference frequency in the period between successive ones of said sampling intervals; and a control circuit coupled between said detector means and said control means for applying said control signal to said control means so to adjust said quenching frequency that variations in said cumulative phase shift are less than ±180 degrees in each one of a series of sampling intervals.

14. A system for translating an applied angular-velocity-modulated carrier-wave signal comprising: a super-regenerative amplifier and an associated quench-frequency oscillator for sampling said signal during successive sampling intervals to develop a pulse-modulated signal having angular-velocity-modulation components corresponding to the modulation of said applied signal; detector means having a given reference frequency for deriving the angular-velocity-modulation components of said pulse-modulated signal to provide a control signal varying with the instantaneous frequency of said applied signal; control means for adjusting the operating frequency of said oscillator to determine the cumulative phase shift of said pulse-modulated signal relative to said reference frequency in the period between successive ones of said sampling intervals; and a control circuit coupled between said detector means and said control means for applying said control signal to said control means so to adjust said operating frequency of said oscillator that variations in said cumulative phase shift are less than ±180 degrees in each one of a series of sampling intervals.

BERNARD D. LOUGHLIN.

REFERENCES CITED

The following references are of record in the file of this patent:

UNITED STATES PATENTS

| Number | Name | Date |
| --- | --- | --- |
| 2,267,732 | Hansell | Dec. 30, 1941 |
| 2,273,090 | Crosby | Feb. 17, 1942 |
| 2,288,575 | Stablein | June 30, 1942 |
| 2,361,437 | Trevor | Oct. 31, 1944 |
| 2,363,571 | Chaffee | Nov. 28, 1944 |
| 2,397,842 | Crosby | Apr. 2, 1946 |
| 2,429,504 | Zeigler | Oct. 21, 1947 |
| 2,476,964 | Earp | July 26, 1949 |
| 2,510,906 | Reid | June 6, 1950 |

OTHER REFERENCES

Kalmus: Some Notes on Superregeneration, Proc. I. R. E., October 1944, pages 591–600.

Bell: Reduction of Band Width in FM Receivers, Wireless Engineer, November 1942, pages 497–502.